United States Patent
Do et al.

(10) Patent No.: US 12,328,355 B2
(45) Date of Patent: Jun. 10, 2025

(54) ELECTRONIC DEVICE FOR TRANSMITTING A PLURALITY OF IMAGE STREAMS DURING PERFORMING VIDEO CALL AND METHOD FOR THE SAME

(71) Applicant: Samsung Electronics Co., Ltd., Suwon-si (KR)

(72) Inventors: Taewon Do, Suwon-si (KR); Yongtae Kim, Suwon-si (KR); Gwanghyun Gho, Suwon-si (KR); Hoonjae Lee, Suwon-si (KR); Hyeyoung Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/939,312

(22) Filed: Sep. 7, 2022

(65) Prior Publication Data

US 2023/0074939 A1 Mar. 9, 2023

Related U.S. Application Data

(63) Continuation of application No. PCT/KR2022/005987, filed on Apr. 27, 2022.

(30) Foreign Application Priority Data

Aug. 23, 2021 (KR) .................. 10-2021-0111226

(51) Int. Cl.
*H04L 65/80* (2022.01)
(52) U.S. Cl.
CPC .................... *H04L 65/80* (2013.01)

(58) Field of Classification Search
CPC ....................................................... H04L 65/80
See application file for complete search history.

(56) References Cited

U.S. PATENT DOCUMENTS 7,808,988 B2 10/2010 Neff
8,159,970 B2 4/2012 Kim et al.
(Continued)

FOREIGN PATENT DOCUMENTS

KR 10-2018-0087697 A 8/2018
KR 10-2018-0108310 A 10/2018
(Continued)

OTHER PUBLICATIONS

European Search Report dated Jun. 13, 2024, issued in European Application No. 22861504.3.

*Primary Examiner* — Olisa Anwah
(74) *Attorney, Agent, or Firm* — Jefferson IP Law, LLP

(57) ABSTRACT

An electronic device and an operating method of an electronic device are provided. The electronic device includes a memory storing a first codec and a second codec having lower performance than the first codec, communication circuitry, and a processor. The processor is configured to receive, from a server related to a video call, performance information of external electronic devices participating in the video call, determine whether to perform encoding using the first codec based on the performance information, and control the communication circuitry to transmit, to the server, a first image stream encoded using the first codec and a second image stream encoded using the second codec based on the determination.

14 Claims, 10 Drawing Sheets

(56) References Cited

U.S. PATENT DOCUMENTS

| | | | |
|---|---|---|---|
| 9,883,139 B2 | 1/2018 | Feng et al. | |
| 9,998,704 B2 * | 6/2018 | Hu | |
| 10,673,908 B2 * | 6/2020 | Prajapat | H04L 65/60 |
| 10,812,760 B2 | 10/2020 | Jung et al. | |
| 10,972,726 B2 | 4/2021 | Wang et al. | |
| 11,171,999 B2 | 11/2021 | Leung et al. | |
| 11,245,914 B2 | 2/2022 | Cho et al. | |
| 2016/0072868 A1 | 3/2016 | Poulin | |
| 2017/0054777 A1 * | 2/2017 | Leung | H04L 65/403 |
| 2018/0027027 A1 * | 1/2018 | Leung | H04L 65/1104 |
| 2018/0279050 A1 | 9/2018 | Ryu | |
| 2021/0184877 A1 | 6/2021 | Blum et al. | |
| 2022/0006843 A1 | 1/2022 | Do et al. | |

FOREIGN PATENT DOCUMENTS

| | | |
|---|---|---|
| KR | 10-2019-0031239 A | 3/2019 |
| KR | 10-2019-0135340 A | 12/2019 |
| KR | 10-2021-0055278 A | 5/2021 |

* cited by examiner

ELECTRONIC DEVICE FOR TRANSMITTING A PLURALITY OF IMAGE STREAMS DURING PERFORMING VIDEO CALL AND METHOD FOR THE SAME

CROSS-REFERENCE TO RELATED APPLICATION(S)

This application is a continuation application, claiming priority under § 365(c), of an International application No. PCT/KR2022/005987, filed on Apr. 27, 2022, which is based on and claims the benefit of a Korean patent application number 10-2021-0111226, filed on Aug. 23, 2021, in the Korean Intellectual Property Office, the disclosure of which is incorporated by reference herein in its entirety.

TECHNICAL FIELD

The disclosure relates to an electronic device and an operating method of the electronic device. More particularly, the disclosure relates to a technology for transmitting a plurality of image streams while a video call is performed.

BACKGROUND ART

Various electronic devices, such as a smartphone, a tablet personal computer (PC), a portable multimedia player (PMP), a personal digital assistant (PDA), a laptop personal computer (PC) and a wearable device, are popularized.

A recent electronic device may provide a video call based on an internet protocol (IP) multimedia subsystem (IMS) or a rich communication suite (RCS). The video call may mean a call using a method of in real time receiving a voice and video transmitted by a counterpart attempting a video call. The video call may use a low bit rate compared to another communication method in order for an electronic device to guarantee an available bandwidth and real-time property. Since a relatively low bit rate is used, quality of images transmitted and/or received upon video call may be limited.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Moreover, an electronic device may support a video call in which a plurality of electronic devices participate. As electronic devices participating in a video call are increased, there may occur a situation in which an image stream having a small size is transmitted due to a limit on a bandwidth.

Furthermore, by considering a case where performance of electronic devices participating in a video call is different, each of the participating electronic devices may perform the video call by using an element which may be supported by all of various electronic devices although elements (e.g., a codec and a pre-processor filter) processing an image transmitted or received in the video call have low performance.

However, even in a situation in which some electronic devices participating in a video call can support elements having relatively high performance, the video call may be performed using an element having low performance. In this case, even in a situation in which a video call having high quality can be implemented even in a limited bandwidth by reducing the capacity of a high-quality image by using a high performance element, a situation in which an electronic device transmits or receives low-quality video may occur.

Aspects of the disclosure are to address at least the above-mentioned problems and/or disadvantages and to provide at least the advantages described below. Accordingly, an aspect of the disclosure is to provide a technology for transmitting a plurality of image streams while a video call is performed.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a memory storing a first codec and a second codec having lower performance than the first codec, communication circuitry, and a processor. The processor may be configured to receive, from a server related to a video call, performance information of external electronic devices participating in the video call, determine whether to perform encoding using the first codec based on the performance information, and control the communication circuitry to transmit, to the server, a first image stream encoded using the first codec and a second image stream encoded using the second codec based on the determination.

In accordance with another aspect of the disclosure, an operating method of an electronic device is provided. The operating method includes receiving, from a server related to a video call, performance information of external electronic devices participating in the video call, determining whether to perform encoding using the first codec based on the performance information, and transmitting, to the server, a first image stream encoded using the first codec and a second image stream encoded using the second codec having lower performance than the first codec based on the determination.

In accordance with another aspect of the disclosure, an electronic device is provided. The electronic device includes communication circuitry and a processor. The processor may be configured to receive, from a server related to a video call, performance information of external electronic devices participating in the video call, determine whether to perform a pre-processing operation using a first transmission filter based on the performance information, and control the communication circuitry to transmit, to the server, an image stream pre-processed and an image stream not pre-processed using the first transmission filter based on the determination of the execution of the pre-processing operation.

In accordance with another aspect of the disclosure, an electronic device is provided. The electronic device includes communication circuitry and a processor. The processor may be configured to transmit, to a server related to a video call, images having different qualities based on state information of a channel used by the electronic device. The number of qualities may be changed based on the state information.

Advantageous Effects of Invention

The electronic device and the operating method of the electronic device according to various embodiments of the disclosure may determine whether to perform encoding using a first codec having relatively high performance (or a high compression ratio) based on performance information of external electronic devices participating in a video call. The electronic device may perform the video call in a way to simultaneously transmit, to the server, a first image stream generated by performing encoding using the first codec and a second image stream generated by performing encoding using a second codec. An electronic device supporting the first codec among the electronic devices participating in the video call may obtain a high-quality image, and an electronic device not supporting the first codec may also perform the video call. Accordingly, the electronic device can implement a video call having relatively high quality and may also enable an electronic device having low performance to perform the video call.

The electronic device and the operating method of the electronic device according to various embodiments of the disclosure may adjust the number of transmitted image streams based on a state of a channel used by the electronic device, the type of communication used by the electronic device and/or the number of external electronic devices participating in a video call. Accordingly, quality of a video call can be improved because the electronic device can transmit image streams having various qualities in a limited bandwidth and enable an external electronic device to adaptively receive images having various qualities depending on a state of a channel.

The electronic device and the operating method of the electronic device according to various embodiments of the disclosure can determine whether to perform a pre-processing operation using a transmission filter capable of improving quality of an image before generating an image stream based on performance information of external electronic devices participating in a video call, and can perform the pre-processing operation using the transmission filter. An electronic device participating in a video call can receive an image having relatively high quality by performing the post-processing of an image generated through the decoding of a received image stream, so quality of the video call can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
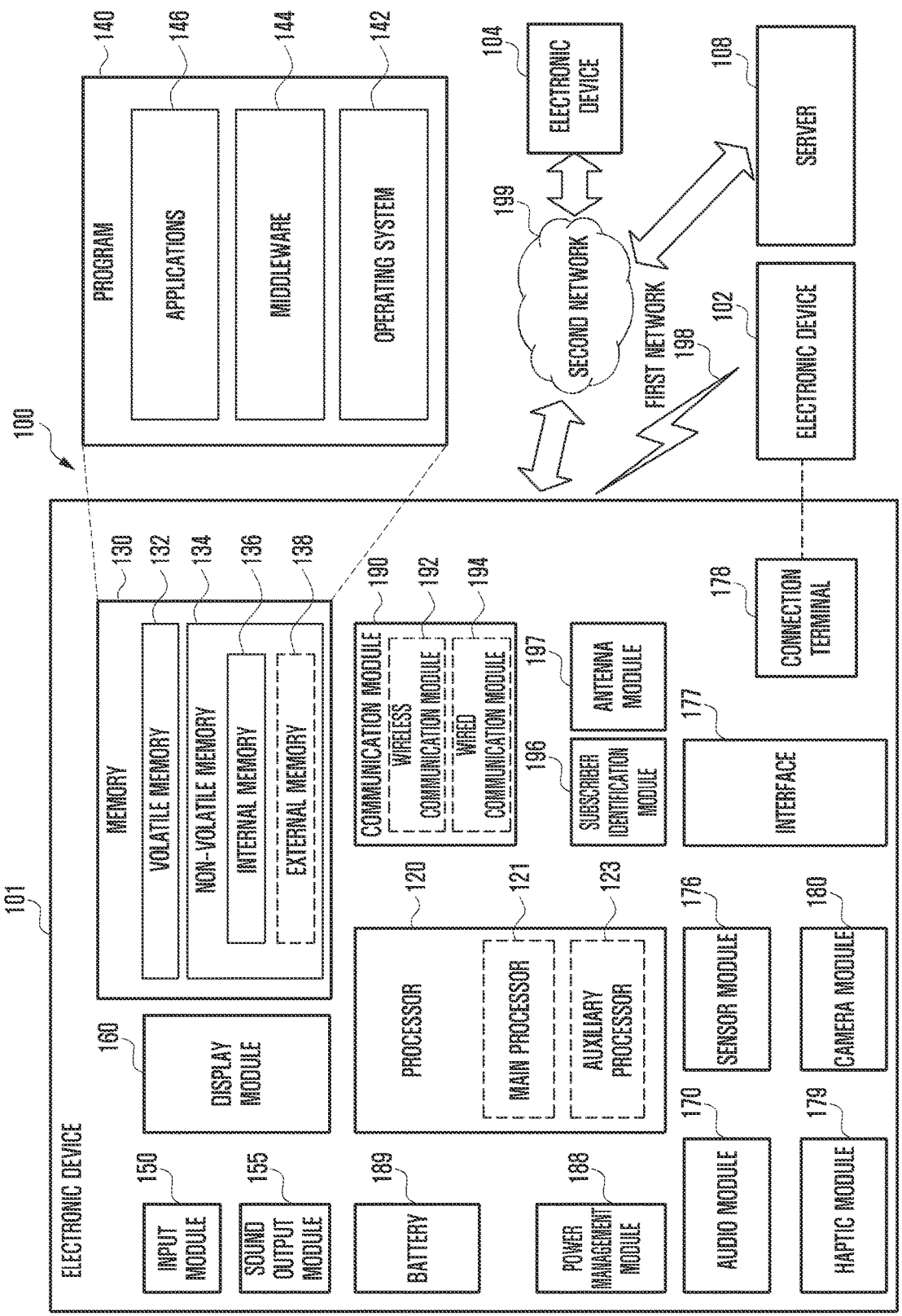
FIG. 1 is a block diagram of an electronic device according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., through wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
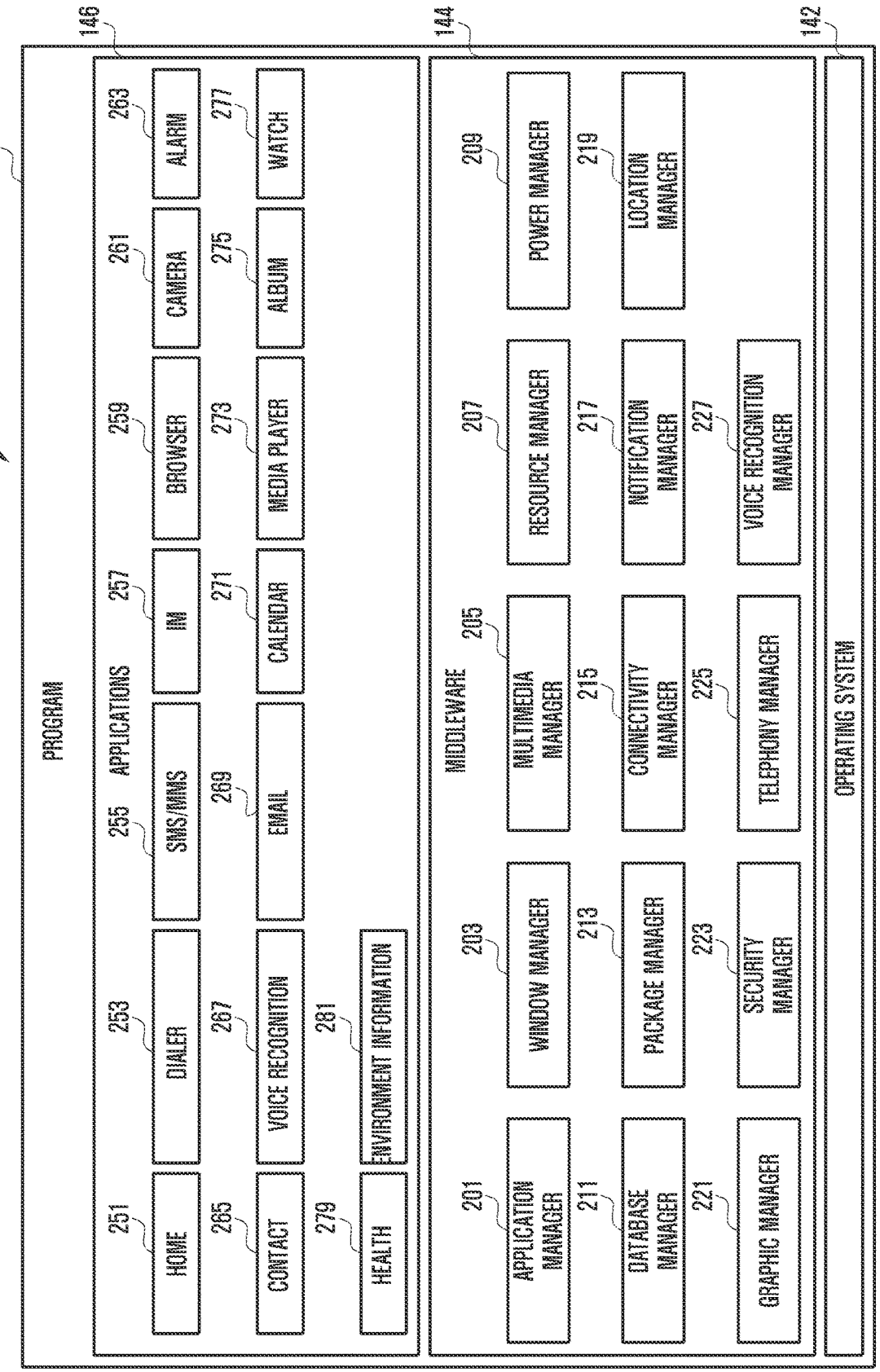
FIG. 2 is a block diagram of a program according to an embodiment of the disclosure.

FIG. 2 is a block diagram 200 illustrating the program 140 according to an embodiment of the disclosure. Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
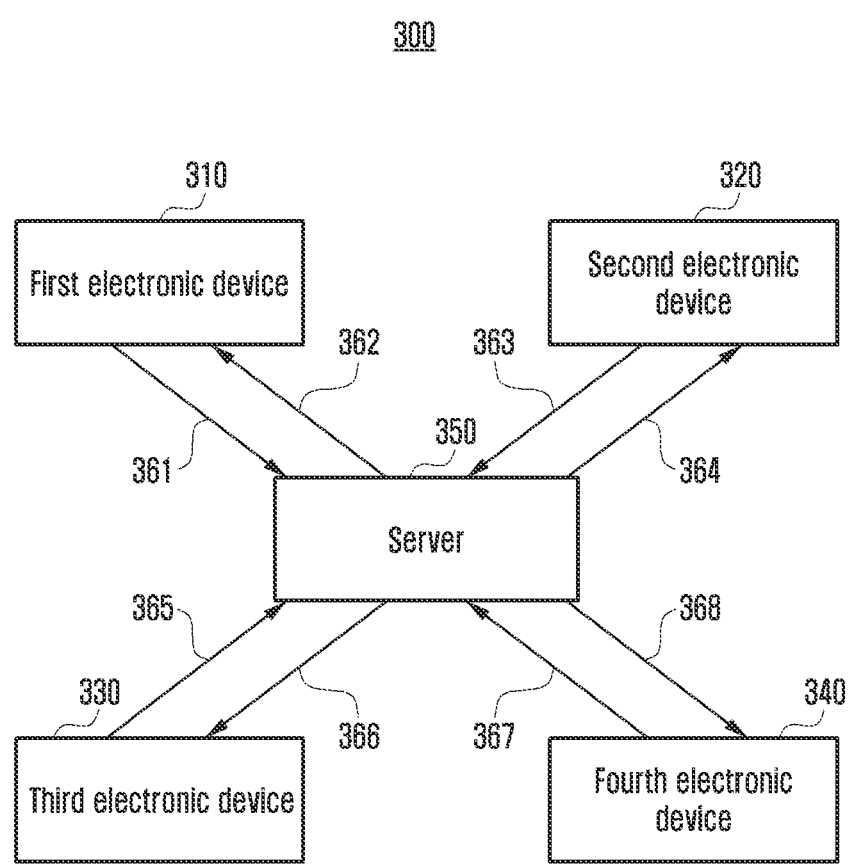
FIG. 3 is a block diagram of a system supporting a video call according to an embodiment of the disclosure.

FIG. 3 is a block diagram of a system supporting a video call according to an embodiment of the disclosure.

Referring to FIG. 3, the system 300 supporting a video call may include a first electronic device 310, a second electronic device 320, a third electronic device 330, a fourth electronic device 340 and/or a server 350 related to a video call.

In FIG. 3, the first electronic device 310, the second electronic device 320, the third electronic device 330 and the fourth electronic device 340 are assumed to participate in a video call. The number of electronic devices participating in the video call is not limited.

According to various embodiments of the disclosure, the first electronic device 310 may generate image streams 361 having various qualities. The first electronic device 310 may generate the image streams 361 by using an original image collected through a camera (e.g., the camera module 180 in FIG. 1) or an original image stored in a memory (e.g., the memory 130 in FIG. 1). Qualities of the image streams may be different. For example, the first electronic device 310 may generate a first image stream including a first image having lower quality than the original image and a second image stream including a second image having lower quality than the first image, and may transmit a plurality of image streams 361, including the first image stream and the second image stream, to the server 350. In generating the first image stream and the second image stream, the first electronic device 310 may generate the first image stream and the second image stream by using the same codec (or encoder).

According to various embodiments of the disclosure, the second electronic device 320 may generate image streams 363 having various qualities. The second electronic device 320 may generate the image streams 363 by using an original image collected through a camera (e.g., the camera module 180 in FIG. 1) or an original image stored in a memory (e.g., the memory 130 in FIG. 1). Qualities of the image streams may be different. For example, the second electronic device 320 may generate a first image stream including a first image having lower quality than the original image and a second image stream including a second image having lower quality than the first image, and may transmit a plurality of image streams 363, including the first image stream and the second image stream, to the server 350. In generating the first image stream and the second image stream, the second electronic device 320 may generate the first image stream and the second image stream by using the same codec (or encoder).

According to various embodiments of the disclosure, the third electronic device 330 may generate image streams 365 having various qualities. The third electronic device 330 may generate the image streams 365 by using an original image collected through a camera (e.g., the camera module 180 in FIG. 1) or an original image stored in a memory (e.g., the memory 130 in FIG. 1). Qualities of the image streams may be different. For example, the third electronic device 330 may generate a first image stream including a first image having lower quality than the original image and a second image stream including a second image having lower quality than the first image, and may transmit a plurality of image streams 365, including the first image stream and the second image stream, to the server 350. In generating the first image stream and the second image stream, the third electronic device 330 may generate the first image stream and the second image stream by using the same codec (or encoder).

According to various embodiments of the disclosure, the fourth electronic device 340 may generate image streams 367 having various qualities. The fourth electronic device 340 may generate the image streams 367 by using an original image collected through a camera (e.g., the camera module 180 in FIG. 1) or an original image stored in a memory (e.g., the memory 130 in FIG. 1). Qualities of the image streams may be different. For example, the fourth electronic device 340 may generate a first image stream including a first image having lower quality than the original image and a second image stream including a second image having lower quality than the first image, and may transmit a plurality of image streams 367, including the first image stream and the second image stream, to the server 350. In generating the first image stream and the second image stream, the fourth electronic device 340 may generate the first image stream and the second image stream by using the same codec (or encoder).

The first image stream generated by the first electronic device 310, the first image stream generated by the second electronic device 320, the first image stream generated by the third electronic device 330, and the first image stream generated by the fourth electronic device 340 may have the same resolution or may have different resolutions. The second image stream generated by the first electronic device 310, the second image stream generated by the second electronic device 320, the second image stream generated by the third electronic device 330, and the second image stream generated by the fourth electronic device 340 may have the same resolution or may have different resolutions.

The server 350 may include a selective forwarding unit (SFU) server supporting a video call in a way to deliver, to another electronic device, images transmitted by a plurality of electronic devices and/or a signaling server supporting a video call in a way to deliver control information related to the video call. The SFU server and the signaling server may be implemented in a way to be separated from each other physically or in software and may be implemented as one server in which functions of the SFU server and the signaling server are integrated.

The server 350 may support a video call by transmitting, to another electronic device, the plurality of image streams 361, 363, 365, and 367 transmitted by a plurality of electronic devices including the first electronic device 310 to the fourth electronic device 340. The server 350 may select and transmit an image stream having a specific quality among image streams having a plurality of qualities based on a state of a radio channel used by the plurality of electronic devices.

The server 350 may transmit any one of a plurality of image streams including the first image stream and the second image stream having lower quality of the first image stream, which is transmitted by the first electronic device 310, to the second electronic device 320, the third electronic device 330, and the fourth electronic device 340.

The server 350 may receive state information of a channel transmitted by the first electronic device 310, may select one of the plurality of image streams 363 transmitted by the second electronic device 320 based on the state information, may select one of the plurality of image streams 365 transmitted by the third electronic device 330 based on the state information, may select one of the plurality of image streams 367 transmitted by the fourth electronic device 340 based on the state information, and may transmit selected image streams 362 to the first electronic device 310. For example, if a state of a channel used by the first electronic device 310 is not good to the extent that an image stream having relatively good quality may not be received, the server 350 may transmit, to the first electronic device 310, an image stream having relatively low quality among a plurality of image streams.

The server 350 may receive state information of a channel transmitted by the second electronic device 320, may select one of the plurality of image streams 361 transmitted by the first electronic device 310 based on the state information, may select one of the plurality of image streams 365 transmitted by the third electronic device 330 based on the state information, may select one of the plurality of image streams 367 transmitted by the fourth electronic device 340 based on the state information, and may transmit selected image streams 364 to the second electronic device 320. For example, if a state of a channel used by the second electronic device 320 is not good to the extent that an image stream having relatively good quality may not be received, the server 350 may transmit, to the second electronic device 320, an image stream having relatively low quality among a plurality of image streams.

The server 350 may receive state information of a channel transmitted by the third electronic device 330, may select one of the plurality of image streams 361 transmitted by the first electronic device 310 based on the state information, may select one of the plurality of image streams 363 transmitted by the second electronic device 320 based on the state information, may select one of the plurality of image streams 367 transmitted by the fourth electronic device 340 based on the state information, and may transmit selected image streams 366 to the third electronic device 330. For example, if a state of a channel used by the third electronic device 330 is not good to the extent that an image stream having relatively good quality may not be received, the server 350 may transmit, to the third electronic device 330, an image stream having relatively low quality among a plurality of image streams.

The server 350 may receive state information of a channel transmitted by the fourth electronic device 340, may select one of the plurality of image streams 361 transmitted by the first electronic device 310 based on the state information, may select one of the plurality of image streams 363 transmitted by the second electronic device 320 based on the state information, may select one of the plurality of image streams 365 transmitted by the third electronic device 330 based on the state information, and may transmit selected image streams 368 to the fourth electronic device 340. For example, if a state of a channel used by the fourth electronic device 340 is not good to the extent that an image stream having relatively good quality may not be received, the server 350 may transmit, to the fourth electronic device 340 an image stream having relatively low quality among a plurality of image streams.

Performance of a plurality of electronic devices participating in a video call may be different. For example, the first electronic device 310, the second electronic device 320 and/or the third electronic device 330 may support both a first codec (e.g., AV1, VP9, H.265, H.264) having a relatively high compression ratio or capable of performing encoding or decoding by using a separate hardware element for encoding or decoding and a second codec (e.g., AV1, VP8, H.263) having a relatively lower compression ratio than the first codec or performed on a processor (e.g., the processor 120 in FIG. 1) not a separate hardware element for encoding or decoding, but the fourth electronic device 340 may support only the second codec without supporting the first codec having a relatively high compression ratio. In this case, the first electronic device 310, the second electronic device 320 and/or the third electronic device 330 may generate an image stream by using the second codec although they can support the first codec. Assuming that an image stream generated using the second codec having a relatively low compression ratio has resolution identical with or similar to that of an image stream generated using the first codec, the image stream generated using the second codec may have a larger size than the image stream generated using the first codec. The size of a bandwidth required upon video call may be increased because a bandwidth required for a situation in which transmission is performed by using an image stream generated using the second codec is inevitably greater than a bandwidth required for a situation in which transmission is performed by using an image stream generated using the first codec. Hereinafter, various embodiments for reducing the size of a bandwidth required upon video call are described.

Figure 4:
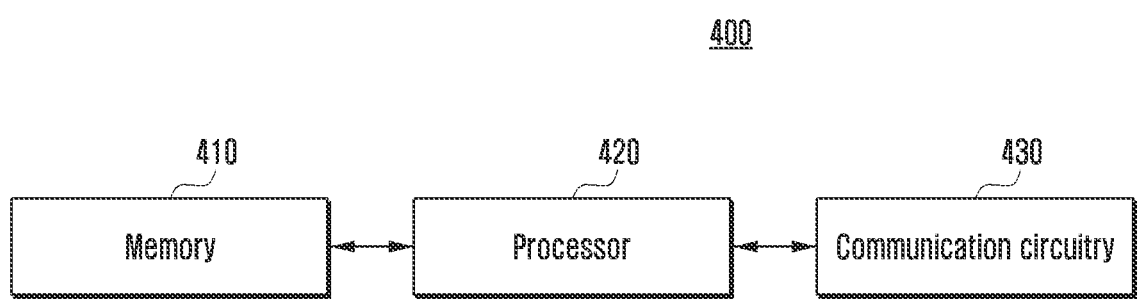
FIG. 4 is a block diagram of an electronic device according to an embodiment of the disclosure.

FIG. 4 is a block diagram of an electronic device according to an embodiment of the disclosure.

Referring to FIG. 4, an electronic device 400 (e.g., the first electronic device 310 in FIG. 3) may include a memory 410 (e.g., the memory 130 in FIG. 1), a processor 420 (e.g., the processor 120 in FIG. 1) and/or communication circuitry 430 (e.g., the communication module 190 in FIG. 1).

The memory 410 may temporarily and/or non-temporarily store an image obtained in various ways. The image may be obtained through a camera (e.g., the camera module 180 in FIG. 1) and may also be obtained in a way to receive the image from another external electronic device. The memory 410 may store various codecs for encoding the obtained image. The codec may be a software and/or hardware element for generating an image stream to be transmitted to a server (e.g., the server 350 in FIG. 3) in a way to encode the obtained image. The memory 410 may store a first codec and/or a second codec having lower performance than the first codec.

After loading the first codec and/or the second codec stored in the memory 410, the processor 420 may generate an image stream in a way to encode an image stored in the memory 410.

The processor 420 may control the communication circuitry 430 to perform a communication connection with the server 350. The processor 420 may control the communication circuitry 430 to transmit various data to the server 350 through an established channel. The processor 420 may control the communication circuitry 430 to transmit generated image streams to the server 350.

The processor 420 may control the communication circuitry 430 to transmit a request message to request a video call to the server 350 in order to perform the video call. The request message may be implemented in the form of a session description protocol (SDP) invite message defined in an SDP. The request message may include performance information of the electronic device 400. The performance information of the electronic device 400 may be included in a message body field of the SDP invite message.

The performance information of the electronic device 400 may include quality information of voice data or video data (or an image stream) which may be transmitted by the electronic device 400. For example, the quality information of the voice data may include a sampling rate of the voice data, a sampling rate of the voice data which may be transmitted over a network or a sampling rate of the voice data which may be received by the electronic device 400. The quality information of the video data may include resolution of the video data which may be generated using the camera 180, resolution of the video data which may be transmitted over a network or resolution of the video data which may be received by an external electronic device.

The performance information of the electronic device 400 may include information of a codec supported by the electronic device 400. For example, if the electronic device 400 supports a first codec that is a codec (e.g., AV1, VP9, H.265, H.264) having relatively high performance, the performance information of the electronic device 400 may include information indicating that the electronic device 400 supports the first codec. For another example, if the electronic device 400 supports a second codec that is a codec (e.g., VP8, H.263) having relatively low performance, the performance information of the electronic device 400 may include information indicating that the electronic device 400 supports the second codec.

The processor 420 may transmit performance information of the electronic device 400 even during a video call. The processor 420 may add performance information of the electronic device 400 to a specific field (e.g., an extension field) of a header part of a real time protocol (RTP) packet including an image stream which may be transmitted to the server 350 during a video call, and may add performance information of the electronic device 400 to a specific field of a header part of a real time control packet (RTCP) packet including control information which may be transmitted to the server 350 during a video call.

The processor 420 may transmit, to the server 350, state information of a channel which is used for the electronic device 400 to perform a video call during a process of establishing the video call or during the video call. The state information of the channel may mean information on various states, including quality of the channel, a bandwidth of the channel, and a data transfer rate using the channel. The server 350 may select an image stream which may be transmitted to each of electronic devices (e.g., the first electronic device 310, the second electronic device 320, the third electronic device 330 and/or the fourth electronic device 340) participating in a video call based on state information of channels transmitted by the electronic devices.

The processor 420 may receive, from the server 350, performance information of external electronic devices (e.g., the second electronic device 320, the third electronic device 330, and the fourth electronic device 340) participating in a video call during a process of establishing the video call or during the video call. The performance information of the external electronic device may be included in a response message corresponding to a video call request message. The performance information of the external electronic device may include information of a codec supported by the external electronic device. For example, if an external electronic device supports a first codec that is a codec (e.g., AV1, VP9, H.265, H.264) having relatively high performance, performance information of the external electronic device may include information indicating that the external electronic device supports the first codec. For another example, if an external electronic device supports a second codec that is a codec (e.g., VP8, H.263) having relatively low performance, performance information of the external electronic device may include information indicating that the external electronic device supports the second codec.

The processor 420 may determine whether to perform encoding using the first codec based on performance information of external electronic devices received from the server 350. The processor 420 may determine to perform the encoding using the first codec based on the identification of at least one of external electronic devices participating in a video call supporting the first codec, based on the performance information of the external electronic devices received from the server 350. The encoding using the first codec may include an operation of generating a first image stream in a way to perform the encoding on an image temporarily or non-temporarily stored in the memory 410 by using the first codec.

The processor 420 may generate a second image stream by using the second codec. The second codec is a codec having lower performance than the first codec, and may have lower compression efficiency than the first codec. The processor 420 may perform encoding using the second codec based on the identification that external electronic devices participating in a video call do not support the first codec, based on performance information of the external electronic devices from the server 350. The encoding using the second codec may include an operation of generating a second image stream in a way to perform encoding on an image temporarily or non-temporarily stored in the memory 410 by using the second codec. The processor 420 may perform the encoding using the second codec based on the identification that all of external electronic devices participating in a video call support the first codec, based on performance information of the external electronic devices received from the server 350.

The processor 420 may generate a first image having quality identical to or more reduced (or deteriorated) than quality of an original image. The first image may be an image obtained by adjusting the size of the original image (or by resizing the original image) by using a specific filter (e.g., a low pass filter (LPF)). The processor 420 may load the first codec stored in the memory 410, and may generate a first image stream in a way to perform encoding on the first image by using the first codec. The processor 420 may generate a second image having lower quality than the first image by using the original image. The processor 420 may load the second codec stored in the memory 410, and may generate a second image stream in a way to perform encoding on the second image by using the second codec. The first image and the second image may be images which are different in quality, but include the same object. The second image stream may be an image stream having lower quality than the first image stream.

The processor 420 may control the communication circuitry 430 to transmit, to the server 350, the first image stream encoded using the first codec and the second image stream encoded using the second codec.

The server 350 may select one of a plurality of image streams transmitted by an external electronic device based on state information of a channel transmitted by the electronic device 400, and may transmit the selected image stream to the electronic device 400. The server 350 may transmit, to the electronic device 400, an image stream having relatively better quality as a state of a channel is better. Alternatively, the server 350 may transmit, to the electronic device 400, an image stream having relatively poorer quality as a state of a channel is poorer. The processor 420 may receive an image stream transmitted by the server 350, and may identify encoding information of the image stream. The encoding information may include information of a codec that has performed encoding on the image stream. The image stream transmitted by the server 350 may be transmitted in the form of a real-time package (RTP) packet, and may include encoding information of the image stream in a header part of the RTP packet. The processor 420 may select a codec that will perform the decoding of the image stream based on the encoding information of the image stream, and may perform the decoding of the image stream by using the selected codec. The processor 420 may display a decoded image on a display (e.g., the display module 160 in FIG. 1).

In the embodiment described so far, it has been illustrated that the electronic device 400 generates and transmits two image streams, but the electronic device 400 may perform the generation and transmission of more image streams not two image streams. For example, the processor 420 may generate a first image stream based on a first image having the same quality as or lower quality than an original image, may generate a second image stream based on a second image having lower quality than the first image, and may generate a third image stream based on a third image having lower quality than the second image. Furthermore, the electronic device 400 may change the number of image streams to be generated and transmitted based on a state of a channel used by the electronic device 400 or the type of communication (e.g., short-range wireless communication or cellular wireless communication) used by the electronic device 400. In the aforementioned embodiment, an embodiment using two codecs has been described, but the disclosure is not limited to the number of codecs. If a plurality of image streams is generated and transmitted, the electronic device 400 may use a plurality of codecs including a first codec and a second codec. The processor 420 may generate a first image stream based on the first codec, may generate a second image stream based on the second codec, and may generate a third image stream based on a third codec.

The processor 420 may determine (or change) the number of image streams to be transmitted based on quality of a channel used by the electronic device 400. The processor 420 may determine the number of resolution levels of image streams to be transmitted with reference to data to which the number of resolution levels of the image streams according to quality of a channel used by the electronic device 400 has been mapped on the memory 410. For example, the mapped data may be implemented as in Table 1 below.

TABLE 1

| Quality of a channel | Number of resolution levels |
| --- | --- |
| First level | Five (high resolution, middle-high resolution, middle resolution, low-middle resolution, low resolution) |
| Second level | Four (high resolution, middle-high resolution, middle resolution, low resolution) |
| Third level | three (high resolution, middle resolution, low resolution) |

Referring to Table 1, the first level is quality of a channel higher than the second level. The second level is quality of a channel higher than the third level. As quality of a channel is higher, the electronic device 400 may transmit a larger number of image streams because more bandwidths can be allocated to the electronic device 400. The processor 420 may increase the number of image streams to be transmitted as quality of a channel used by the electronic device 400 for a video call becomes better. The processor 420 may decrease the number of image streams to be transmitted as quality of a channel used by the electronic device 400 for a video call is decreased. The processor 420 may determine (or adjust) the number of codecs to be used based on the number of image streams to be transmitted. For example, the processor 420 may generate an image stream by using the number of codecs smaller than the number of codecs used in the first level based on the identification of quality of a channel being the second level. For another example, the processor 420 may generate an image stream by using the number of codecs smaller than the number of codecs used in the second level based on the identification of quality of a channel being the third level. The processor 420 may decrease a consumption current of the electronic device 400 by changing a state of a specific codec into a deactivation state as the number of codecs to be used is decreased.

The processor 420 may determine (or change) the number of image streams to be generated and transmitted based on the type of communication (e.g., short-range wireless communication or cellular wireless communication) used by the electronic device 400. The short-range wireless communication may have a wider bandwidth than the cellular wireless communication. Accordingly, the processor 420 may generate and transmit image streams greater than the number of image streams to be transmitted when the electronic device 400 uses cellular communication in the state in which the electronic device 400 has been connected to the short-range wireless communication.

Through such a method, the electronic device 400 may change the number of image streams based on a state of a channel or the type of communication used. Accordingly, the server 350 may transmit an image stream having proper quality suitable for a situation of an external electronic device.

The processor 420 may determine (or change) the number of image streams based on the number of external electronic devices participating in a video call. According to an embodiment, the processor 420 may decrease the number of image streams based on the number of external electronic devices being greater than a designated number (e.g., a maximum number of image streams which may be displayed on the display 180).

The electronic device 400 may perform a pre-processing operation on an image before performing the encoding of the image for an image having relatively high quality.

The processor 420 may perform a pre-processing operation on an image as a part of an operation of generating an image stream. The processor 420 may perform a pre-processing operation on an image by using a transmission filter, and may generate an image stream in a way to encode the pre-processed image by using a first codec or a second codec.

The transmission filter may include a plurality of transmission filters including a first transmission filter and a second transmission filter. The first transmission filter may be a filter capable of implementing an image having relatively higher quality than an image pre-processed using the second transmission filter in a pre-processing operation for an image. The first transmission filter may be a filter which is used for a neural processing unit of the electronic device 400 to process an image.

The processor 420 may control the communication circuitry 430 to transmit, to the server 350, a request message to request a video call in order to perform the video call. If a video call has been implemented based on an IP multimedia subsystem (IMS), a request message may be implemented in the form of a session description protocol (SDP) invite message defined in an SDP. The request message may include performance information of the electronic device 400. The performance information of the electronic device 400 may be included in a message body field of the SDP invite message. Alternatively, if a video call has been implemented based on a real-time transport protocol (RTP), performance information of the electronic device 400 may be included in a message implemented in an RTP or an RTP control protocol (RTCP). The performance information of the electronic device 400 may include information on whether the electronic device 400 supports the pre-processing of an image using the first transmission filter and/or the second transmission filter. For example, if the electronic device 400 supports the first transmission filter capable of implementing relatively high picture quality, performance information of the electronic device 400 may include information indicating that the electronic device 400 supports the first transmission filter. If the electronic device 400 supports the second transmission filter capable of implementing relatively low picture quality, performance information of the electronic device 400 may include information indicating that the electronic device 400 supports the second transmission filter.

The processor 420 may receive, from the server 350, performance information of external electronic devices (e.g., the second electronic device 320, the third electronic device 330, and the fourth electronic device 340) participating in a video call during a process of establishing the video call or during the video call. The performance information of the external electronic device may be included in a response message corresponding to a video call request message. The performance information of the external electronic device may include information indicating whether the external electronic device supports a first reception filter corresponding to a first transmission filter and/or information indicating whether the external electronic device supports a second reception filter corresponding to a second transmission filter. For example, if an external electronic device supports the first reception filter capable of implementing relatively high picture quality, performance information of the external electronic device may include information indicating that the external electronic device supports the first reception filter. If an external electronic device supports the second reception filter capable of supporting relatively low picture quality, performance information of the external electronic device may include information indicating that the external electronic device supports the second reception filter.

The processor 420 may determine whether to perform a pre-processing operation using a first transmission filter based on performance information of external electronic devices received from the server 350. The processor 420 may determine to perform a pre-processing operation using the first transmission filter based on the identification that at least one of external electronic devices participating in a video call supports a pre-processing operation using the first transmission filter, based on the performance information of the external electronic devices received from the server 350. The processor 420 may perform a pre-processing operation on a second image, which is used to generate a second image stream having relatively low quality, by using the first transmission filter, and may perform a pre-processing operation on a first image, which is used to generate a first image stream having relatively high quality, by using a second transmission filter.

The processor 420 may perform a pre-processing operation using a second transmission filter based on the identification that some of external electronic devices participating in a video call do not support a first reception filter corresponding to a first transmission filter, based on performance information of the external electronic devices received from the server 350.

The processor 420 may generate a first image which has quality identical to or more reduced (or deteriorated) than quality of an original image and which will be transmitted to the server 350. The processor 420 may load a second transmission filter stored in the memory 410, and may generate a first image stream in a way to perform the pre-processing of the first image by using the second transmission filter. The processor 420 may generate a second image having lower quality than the first image by using the original image. The processor 420 may load, into a separate element (e.g., a neural processing unit or a graphic processing unit), a first transmission filter stored in the memory 410, and may generate a second image stream in a way to control the separate element to perform the pre-processing of the second image by using the first transmission filter. The first image and the second image may be images which are different in quality, but include the same object. The second image stream may be an image stream having lower quality than the first image stream.

The processor 420 may control the communication circuitry 430 to transmit the first image stream and the second image stream to the server 350.

The server 350 may select one of a plurality of image streams transmitted by external electronic devices based on state information of a channel transmitted by the electronic device 400, and may transmit the selected image stream to the electronic device 400. The server 350 may transmit, to the electronic device 400, an image stream having relatively better quality when a state of the channel is improved. Alternatively, the server 350 may transmit, to the electronic device 400, an image stream having relatively poorer quality when a state of the channel is reduced. The processor 420 may receive the image stream transmitted by the server 350 and identify encoding information of the image stream. The encoding information may include transmission filter information used to perform a pre-processing operation on an image included in the image stream. The image stream transmitted by the server 350 may be transmitted in the form of a real-time package (RTP) packet. The transmission filter information may be included in a header part of the RTP packet. The processor 420 may select a reception filter for the post-processing of the image generated by the decoding of the image stream based on the transmission filter information of the image stream, and may perform the post-processing of the image by using the selected reception filter. The processor 420 may display the post-processed image on the display 160.

The processor 420 may use a first transmission filter 621 not a second transmission filter 622 in pre-processing a first image 611 regardless of performance information of external electronic devices participating in a video call, and may use the second transmission filter 622 not the first transmission filter 621 in pre-processing a second image 612.

Figure 5:
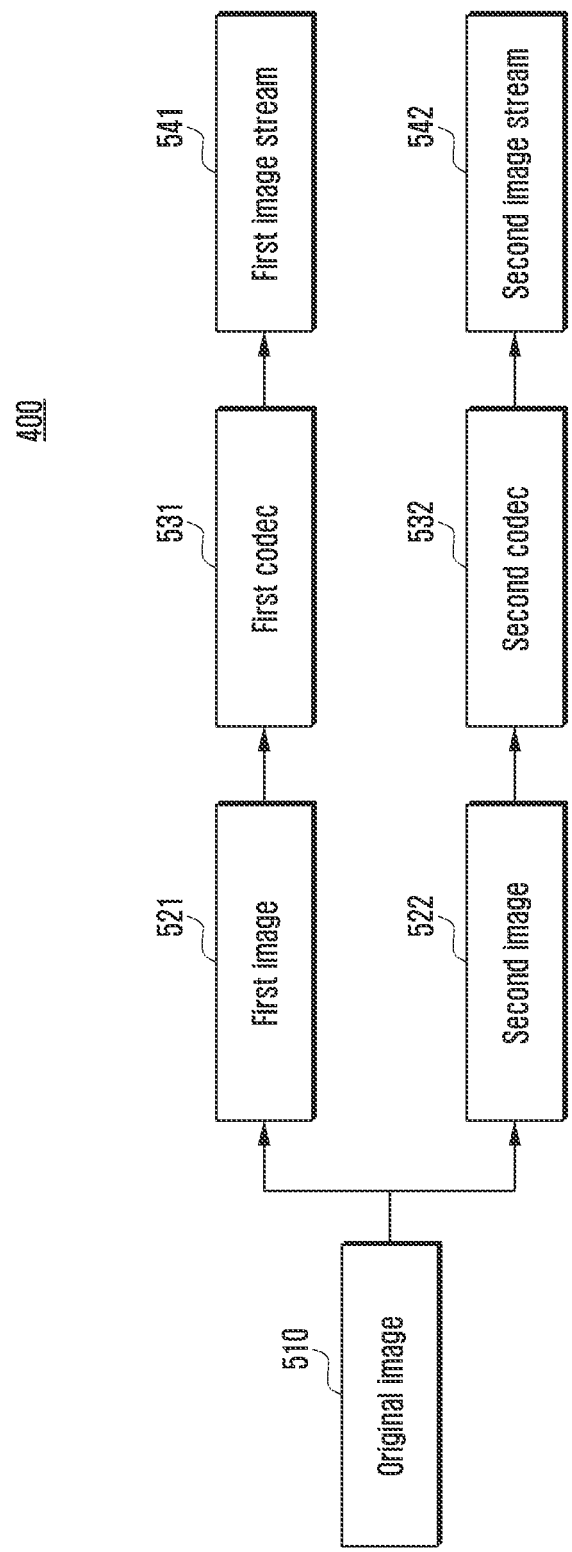
FIG. 5 is a diagram illustrating an embodiment in which an electronic device generates a plurality of image streams based on performance information of an external electronic device according to an embodiment of the disclosure.

FIG. 5 is a diagram illustrating an embodiment in which an electronic device generates a plurality of image streams based on performance information of an external electronic device according to an embodiment of the disclosure.

Referring to FIG. 5, a processor (e.g., the processor 420 in FIG. 4) may determine whether to perform encoding through the first codec 531 based on performance information of external electronic devices received from the server 350. The processor 420 may determine to perform encoding using a first codec 531 based on the identification that at least one of external electronic devices participating in a video call supports the first codec 531 based on performance information of the external electronic devices received from the server 350. The encoding using the first codec 531 may include an operation of generating a first image stream 541 in a way to perform encoding on a first image 521 corresponding to an original image 510 temporarily or non-temporarily stored in the memory 130 by using the first codec 531.

The processor 420 may generate the first image 521 having quality identical with or lower than quality of the original image 510 stored in the memory 410. The processor 420 may perform the encoding of the first image 521 by using the first codec 531. The processor 420 may perform the encoding of the first image 521 by using a second codec 532 if all external electronic devices participating in a video call do not support the first codec 531. The processor 410 may generate the first image stream 541 including the encoded first image 521.

The processor 420 may generate a second image 522 having lower quality than the first image 521. The processor 420 may load the second codec 532 stored in the memory 410, and may generate a second image stream 542 in a way to perform the encoding of the second image 522 by using the second codec 532. The first image 521 and the second image 522 may be images which are different in quality, but are generated based on the original image 510. The second image stream 542 may be an image stream having lower quality than the first image stream 541. The processor 420 may perform the encoding of the second image 522 by using the first codec 531 if all of external electronic devices participating in a video call support the first codec 531.

Figure 6:
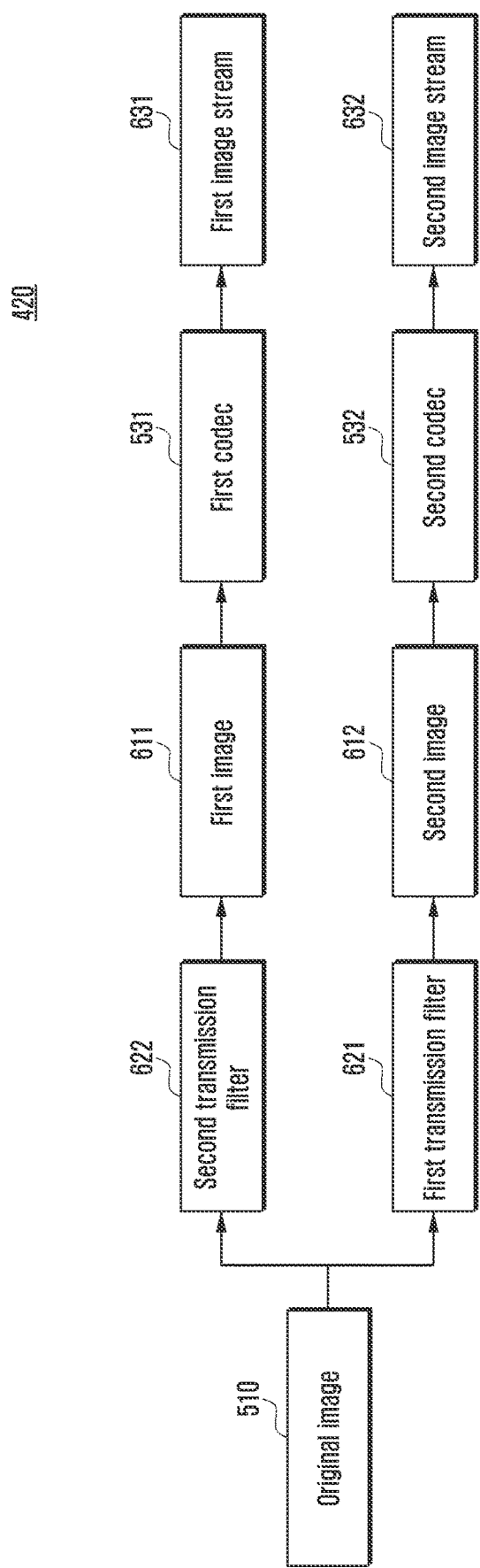
FIG. 6 is a diagram illustrating an embodiment in which an electronic device generates a plurality of image streams based on performance information of an external electronic device according to an embodiment of the disclosure.

FIG. 6 is a diagram illustrating an embodiment in which an electronic device generates a plurality of image streams based on performance information of an external electronic device according to an embodiment of the disclosure.

The electronic device 400 may perform a pre-processing operation on an image before performing the encoding of the image for an image having relatively high quality.

Referring to FIG. 6, the processor 420 may perform a pre-processing operation on an image as a part of an operation of generating an image stream. The processor 420 may perform a pre-processing operation on a first image 611 and a second image 612 by using a transmission filter (e.g., the first transmission filter 621, the second transmission filter 622), and may generate a first image stream 631 and/or a second image stream 632 in a way to encode the pre-processed image by using a first codec (e.g., the first codec 531 in FIG. 5) or a second codec (e.g., the second codec 532 in FIG. 5).

The transmission filter may include a plurality of transmission filters including the first transmission filter 621 and the second transmission filter 622. The first transmission filter 621 may be a filter capable of implementing an image relatively higher quality than an image pre-processed using the second transmission filter 621 in a pre-processing operation for an image. The first transmission filter 621 may be a filter which is used for a neural processing unit of the electronic device 400 to process an image.

The processor 420 may receive, from the server 350, performance information of external electronic devices (e.g., the second electronic device 320, the third electronic device 330, and the fourth electronic device 340) participating in a video call during a process of establishing the video call or during the video call. The performance information of the external electronic device may be included in a response message corresponding to a video call request message. The performance information of the external electronic device may include information indicating whether the external electronic device supports a first reception filter corresponding to a first transmission filter and/or information indicating whether the external electronic device supports a second reception filter corresponding to a second transmission filter.

For example, if an external electronic device supports a first reception filter corresponding to the first transmission filter 621, performance information of the external electronic device may include information indicating that the external electronic supports the first reception filter. If an external electronic device supports a second reception filter corresponding to the second transmission filter 622, performance information of the external electronic device may include information indicating that the external electronic device supports the second reception filter.

The processor 420 may determine whether to perform a pre-processing operation using the first transmission filter 621 based on performance information of external electronic devices received from the server 350. The processor 420 may determine to perform a pre-processing operation using the first transmission filter 621 based on the identification that at least one of external electronic devices participating in a video call supports the pre-processing operation using the first transmission filter 621, based on performance information of the external electronic devices received from the server 350.

The processor 420 may perform a pre-processing operation on the second image 612 used to generate the second image stream 632 having relatively low quality by using the first transmission filter 621, and may perform a pre-processing operation on the first image 611 used to generate the first image stream 631 having relatively high quality by using the second transmission filter 622.

The processor 420 may perform a pre-processing operation using the second transmission filter 612 based on the identification that some of external electronic devices participating in a video call do not support a first reception filter corresponding to the first transmission filter 611, based on performance information of the external electronic devices received from the server 350.

The processor 420 may generate the first image 611 having quality identical with or more reduced (or deteriorated) than quality of the original image 510. The processor 420 may load the second transmission filter 622 stored in the memory 410, and may generate the first image 611 in a way to decrease the quality of the original image 510 by using the second transmission filter 622. Alternatively, when quality of the original image 510 is a designated quality or less, the processor 420 may generate the first image 611 without performing the pre-processing of the original image 510. The processor 420 may generate the first image stream 631 in a way to encode the generated first image 611 by using the first codec 531. The processor 420 may generate the second image 612 having lower quality than the first image 611 in a way to input the original image 510 to the first transmission filter 621. The processor 420 may load the first transmission filter 621 stored in the memory 410, and may generate the second image 612 in a way to perform the pre-processing of the original image 510 by using the first transmission filter 621. The processor 420 may generate the first image stream 631 in a way to encode the generated second image 612 by using the second codec 532. The first image 611 and the second image 612 may be images which are different in quality, but include the same object. The second image stream 632 may be an image stream having lower quality than the first image stream 631. An external electronic device that has received the second image stream 632 may perform post-processing on an image, generated by decoding the second image stream 632, by using a first reception filter corresponding to the first transmission filter 621. The external electronic device may obtain an image having quality improved through post-processing.

Figure 7:
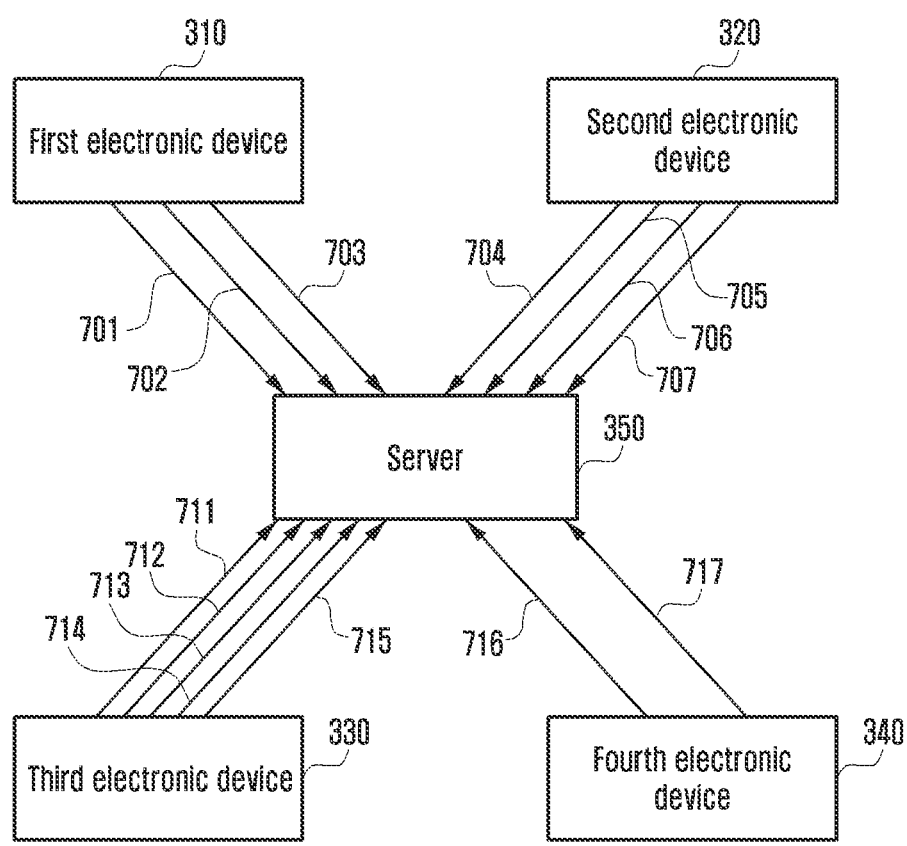
FIG. 7 is a diagram illustrating an embodiment in which an electronic device generates a plurality of image streams based on state information of a channel supporting a video call according to an embodiment of the disclosure.

FIG. 7 is a diagram illustrating an embodiment in which an electronic device generates a plurality of image streams based on state information of a channel supporting a video call according to an embodiment of the disclosure.

Referring to FIG. 7, a first electronic device 310 (e.g., the electronic device 400 in FIG. 4) may determine (or change) the number of image streams to be transmitted based on quality of a channel used by the first electronic device 310. The first electronic device 310 may determine the number of resolution levels of image streams to be transmitted with reference to data to which the number of resolution levels of the image streams according to quality of a channel used by the first electronic device 310 has been mapped on a memory (e.g., the memory 410 in FIG. 4). As the quality of the channel is higher, the first electronic device 310 may transmit a larger number of image streams because more bandwidths can be allocated to the first electronic device 310. The first electronic device 310 may increase the number of image streams to be transmitted as quality of a channel used by the first electronic device 310 for a video call becomes better. Referring to FIG. 7, the first electronic device 310 may transmit, to the server 350, a first image stream 701 having first resolution, a second image stream 702 having second resolution lower than the first resolution and/or a third image stream 703 having third resolution lower than the second resolution.

A second electronic device 320 (e.g., the electronic device 400 in FIG. 4) may determine (or change) the number of image streams to be transmitted based on quality of a channel used by the second electronic device 320. The second electronic device 320 may determine the number of resolution levels of image streams to be transmitted with reference to data to which the number of resolution levels of the image streams according to quality of a channel used by the second electronic device 320 is mapped on a memory (e.g., the memory 410 in FIG. 4). As the quality of the channel is higher, the second electronic device 320 may transmit a larger number of image streams because more bandwidth can be allocated to the second electronic device 320. The second electronic device 310 may increase the number of image streams to be transmitted as quality of a channel used by the second electronic device 320 for a video call becomes better. Assuming that quality of a channel used by the second electronic device 320 is better than quality of a channel used by the first electronic device 310, the second electronic device 320 may transmit, to the server 350, a fourth image stream 704 having first resolution, a fifth image stream 705 having second resolution lower than the first resolution, a sixth image stream 706 having third resolution lower than the second resolution and/or a seventh image stream 707 having fourth resolution lower than the third resolution.

A third electronic device 330 (e.g., the electronic device 400 in FIG. 4) may determine (or change) the number of image streams to be transmitted based on quality of a channel used by the third electronic device 330. The third electronic device 330 may determine the number of resolution levels of image streams to be transmitted with reference to data to which the number of resolution levels of the image streams according to quality of a channel used by the third electronic device 330 has been mapped on a memory (e.g., the memory 410 in FIG. 4). As the quality of the channel is higher, the third electronic device 330 may transmit a larger number of image streams because more bandwidth can be allocated to the third electronic device 330. The third electronic device 330 may increase the number of image streams to be transmitted as quality of a channel used by the third electronic device 330 for a video call becomes better. Assuming that quality of a channel used by the third electronic device 330 is better than quality of a channel used by the second electronic device 320, the second electronic device 330 may transmit, to the server 350, an eighth image stream 711 having first resolution, a ninth image stream 712 having second resolution lower than the first resolution, a tenth image stream 713 having third resolution lower than the second resolution, an eleventh image stream 714 having fourth resolution lower than the third resolution and/or a twelfth image stream 715 having fifth resolution lower than the fourth resolution.

A fourth electronic device (e.g., the electronic device 400 in FIG. 4) 340 may determine (or change) the number of image streams to be transmitted based on quality of a channel used by the fourth electronic device 340. The fourth electronic device 340 may determine the number of resolution levels of image streams to be transmitted with reference to data to which the number of resolution levels of the image streams according to quality of a channel used by the fourth electronic device 340 has been mapped on a memory (e.g., the memory 410 in FIG. 4). As the quality of the channel is higher, the fourth electronic device 340 may transmit a larger number of image streams because more bandwidth can be allocated to the fourth electronic device 340. The fourth electronic device 340 may increase the number of image streams to be transmitted as quality of a channel used by the fourth electronic device 340 for a video call becomes better. Assuming that quality of a channel used by the fourth electronic device 340 is poorer than quality of a channel used by the first electronic device 310, the fourth electronic device 340 may transmit, to the server 350, a thirteenth image stream 716 having first resolution and a fourteenth image stream 717 having second resolution lower than the first resolution.

According to various embodiments of the disclosure, all the first image stream 701 generated by the first electronic device 310, the fourth image stream 704 generated by the second electronic device 320, the eighth image stream 711 generated by the third electronic device 330, and the thirteenth image stream 716 generated by the fourth electronic device 340 have been illustrated as having the first resolution, but the first image stream 701, the fourth image stream 704, the eighth image stream 711, and the thirteenth image stream 716 are image streams transmitted by the respective electronic devices and having the highest resolution, and may have different resolution.

Figure 8:
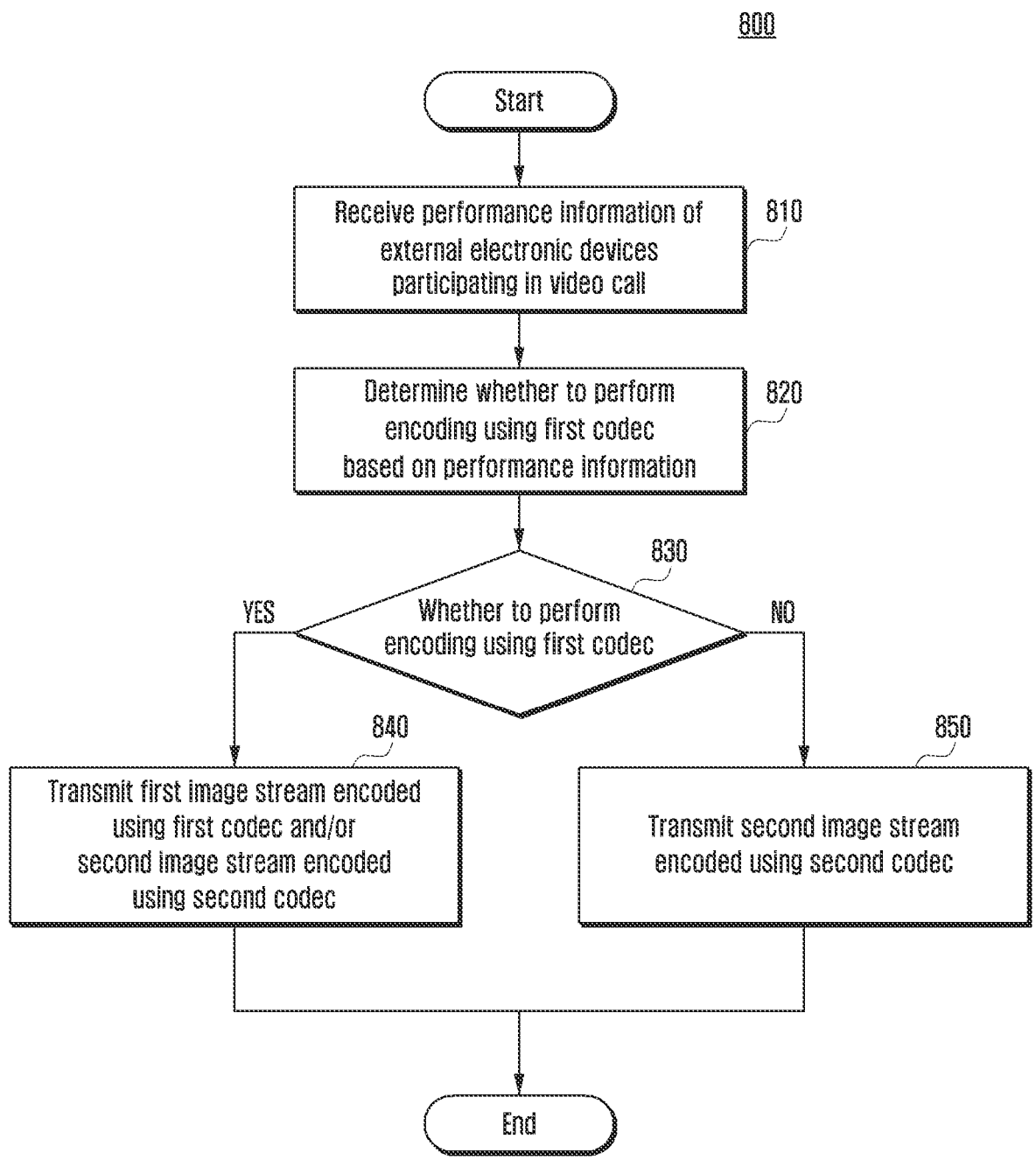
FIG. 8 is an operation flowchart illustrating an operating method of an electronic device according to an embodiment of the disclosure.

FIG. 8 is an operation flowchart illustrating an operating method of an electronic device according to an embodiment of the disclosure.

Operations (e.g., 810, 820, 830, 840, and 850) illustrated in FIG. 8 may be performed on a processor (e.g., the processor 420 in FIG. 4) of an electronic device (e.g., the electronic device 400 in FIG. 4).

Referring to FIG. 8, at operation 810, an electronic device (e.g., the electronic device 400 in FIG. 4) may receive performance information of external electronic devices (e.g., the second electronic device 320, the third electronic device 330 and/or the fourth electronic device 340 in FIG. 3) participating in a video call.

The electronic device 400 may receive, from the server 350, performance information of external electronic devices (e.g., the second electronic device 320, the third electronic device 330, and the fourth electronic device 340) participating in a video call during a process of establishing the video call or during the video call. The performance information of the external electronic device may be included in a response message corresponding to a video call request message. Alternatively, the performance information of the external electronic device may be included in a response message corresponding to an image stream transmitted by the electronic device 400 during the video call. The performance information of the external electronic device may include information of a codec supported by the external electronic device. For example, if an external electronic device supports a first codec (e.g., the first codec 531 in FIG. 5) that is a codec (e.g., AV1, VP9, H.265, H.264) having relatively high performance, performance information of the external electronic device may include information indicating that the external electronic device supports the first codec 531. For another example, if an external electronic device supports a second codec (e.g., the second codec 532 in FIG. 5) that is a codec (e.g., VP8, H.263) having relatively low performance, performance information of the external electronic device may include information indicating that the external electronic device supports the second codec 532.

At operations 820 and 830, the electronic device 400 may determine whether to perform encoding using the first codec 531 based on the performance information of the external electronic device.

The electronic device 400 may determine to perform the encoding using the first codec 531 based on the identification that at least one of the external electronic devices participating in the video call supports the first codec based on the performance information of the external electronic devices received from the server 350. The encoding using the first codec 531 may include an operation of generating a first image stream (e.g., the first image stream 541 in FIG. 5) in a way to perform the encoding on an image (e.g., the first image 521 in FIG. 5) temporarily or non-temporarily stored in a memory (e.g., the memory 410 in FIG. 4) by using the first codec 531.

The electronic device 400 may perform encoding using the second codec 532 without performing the encoding using the first codec 531 based on the identification that the external electronic devices participating in the video call do not support the first codec 531 based on the performance information of the external electronic devices received from the server 350. The encoding using the second codec may include an operation of generating a second image stream (e.g., the second image stream 542 in FIG. 5) in a way to perform encoding on an image (e.g., the second image 522 in FIG. 5) temporarily or non-temporarily stored in the memory 410 by using the second codec. The processor 420 may perform the encoding using the second codec based on the identification that all the external electronic devices participating in the video call support the first codec based on the performance information of the external electronic devices received from the server 350.

At operation 840, the electronic device 400 may transmit, to the server 350, the first image stream 541 encoded using the first codec 531 and/or the second image stream 542 encoded using the second codec 532 based on a determination (operation 830-Y) to perform the encoding using the first codec.

The electronic device 400 may generate the first image 521 having quality identical with or more reduced (or deteriorated) than quality of the original image 511. The electronic device 400 may load the first codec 531 stored in the memory 410, and may generate the first image stream 541 in a way to perform encoding on the first image by using the first codec 531. The electronic device 400 may generate the second image 522 having lower quality than the first image by using the original image 511. The processor 420 may load the second codec 532 stored in the memory 410, and may generate the second image stream 542 in a way to perform the encoding of the second image 522 by using the second codec 532. The first image 521 and the second image 522 may be images which are different in quality, but include the same object. The second image stream 542 may be an image stream having lower quality than the first image stream 541.

The electronic device 400 may generate the first image stream 541 in a way to perform the encoding of the first image 511 by using the first codec 531 and generate the image stream 542 in a way to perform the encoding of the second image 522 by using the first codec 531, based on the identification that all of external electronic devices participating in a video call support the first codec.

At operation 850, the electronic device 400 may transmit, to the server 350, the second image stream 542 encoded using the second codec 532 based on a determination (operation 830-N) to not perform the encoding using the first codec.

The electronic device 400 may generate the first image 521 having quality identical to or more reduced (or deteriorated) than quality of the original image 511. The electronic device 400 may load the second codec 532 stored in the memory 410, and may generate the first image stream 541 in a way to perform the encoding of the first image by using the second codec 532. The electronic device 400 may generate the second image 522 having lower quality than the first image by using the original image 511. The processor 420 may load the second codec 532 stored in the memory 410, and may generate the second image stream 542 in a way to perform the encoding of the second image 522 by using the second codec 532. The first image 521 and the second image 522 may be images which are different in quality, but include the same object. The second image stream 542 may be an image stream having lower quality than the first image stream 541.

Figure 9:
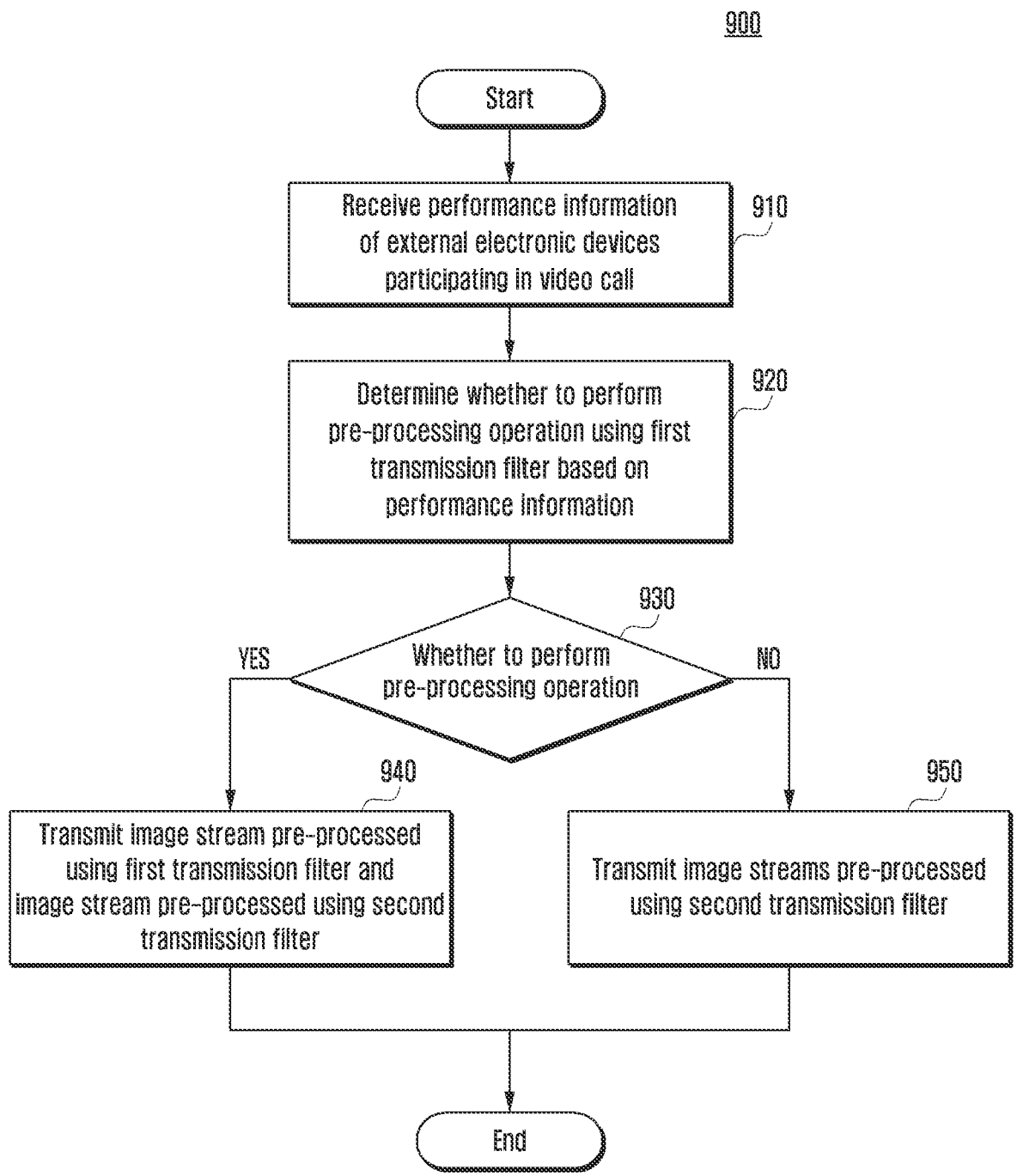
FIG. 9 is an operation flowchart illustrating an operating method of an electronic device according to an embodiment of the disclosure.

FIG. 9 is an operation flowchart illustrating an operating method of an electronic device according to an embodiment of the disclosure.

Operations (e.g., 910, 920, 930, 940, and 950) illustrated in FIG. 9 may be performed on a processor (e.g., the processor 420 in FIG. 4) of an electronic device (e.g., the electronic device 400 in FIG. 4).

Referring to FIG. 9, at operation 910, an electronic device (e.g., the electronic device 400 in FIG. 4) may receive performance information of external electronic devices participating in a video call (e.g., the second electronic device 320, the third electronic device 330 and/or the fourth electronic device 340 in FIG. 3).

The performance information of the external electronic device may be performance information on whether the external electronic device supports a post-processing operation using a reception filter corresponding to a transmission filter used in a pre-processing operation for an image before an image stream is generated. The transmission filter may include a plurality of transmission filters including a first transmission filter (e.g., the first transmission filter 621 in FIG. 6) and a second transmission filter (e.g., the second transmission filter 622 in FIG. 6). The first transmission filter 621 may be a filter capable of implementing an image having relatively higher quality than an image pre-processed using the second transmission filter 621 in a pre-processing operation for an image. The first transmission filter 621 may be a filter which is used for a neural processing unit of the electronic device 400 to process an image.

The electronic device 400 may receive, from the server 350, performance information of external electronic devices (e.g., the second electronic device 320, the third electronic device 330, and the fourth electronic device 340) participating in a video call during a process of establishing the video call or during the video call. The performance information of the external electronic device may be included in a response message corresponding to a video call request message. The performance information of the external electronic device may include information indicating whether the external electronic device supports a first reception filter corresponding to a first transmission filter and/or information indicating whether the external electronic device supports a second reception filter corresponding to a second transmission filter. For example, if an external electronic device supports a first reception filter corresponding to the first transmission filter 621, performance information of the external electronic device may include information indicating that the external electronic device supports the first reception filter. If an external electronic device supports a second reception filter corresponding to the second transmission filter 622, performance information of the external electronic device may include information indicating that the external electronic device supports the second reception filter.

At operations 920 and 930, the electronic device 400 may determine whether to perform a pre-processing operation using the first transmission filter based on the performance information of the external electronic devices.

The electronic device 400 may determine whether to perform the pre-processing operation using the first transmission filter 621 based on the performance information of the external electronic devices received from the server 350.

The electronic device 400 may determine to perform the pre-processing operation using the first transmission filter 621 based on the identification that at least one of the external electronic devices participating in the video call supports the pre-processing operation using the first transmission filter 621, based on the performance information of the external electronic devices received from the server 350.

The electronic device 400 may determine to perform a pre-processing operation using the second transmission filter 622 without performing the pre-processing operation using the first transmission filter 621 based on the identification that all the external electronic devices participating in the video call do not support the pre-processing operation using the first transmission filter 621, based on the performance information of the external electronic devices received from the server 350.

At operation 940, the electronic device 400 may transmit, to the server 350, a second image stream pre-processed using the first transmission filter and a first image stream pre-processed using the second transmission filter based on a determination (operation 930-Y) to perform the pre-processing operation.

The electronic device 400 may generate a first image (e.g., the first image 611 in FIG. 6) having quality identical with or more reduced (or deteriorated) than quality of an original image (e.g., the original image 510 in FIG. 6). The electronic device 400 may load the second transmission filter 622 stored in the memory 410, and may generate a first image stream (e.g., the first image stream 631 in FIG. 6) in a way to perform the pre-processing of the first image 611 by using the second transmission filter 622.

The electronic device 400 may generate a second image (e.g., the second image 612 in FIG. 6) having lower quality than the first image 611 by using the original image 510. The electronic device 400 may load the first transmission filter 621 stored in the memory 410, and may generate a second image stream (e.g., the second image stream 632 in FIG. 6) in a way to perform the pre-processing of the second image 612 by using the first transmission filter 621. The first image 611 and the second image 612 may be images which are different in quality, but include the same object. The second image stream 632 may be an image stream having lower quality than the first image stream 631. The external electronic device that has received the second image stream 632 may perform the post-processing of an image, generated by decoding the second image stream 632, by using a first reception filter corresponding to the first transmission filter 621. The external electronic device may obtain an image having quality improved through post-processing, and may display an image having higher quality than the second image 612.

At operation 950, the electronic device 400 may transmit, to the server 350, a first image stream and a second image stream pre-processed using the second transmission filter based on a determination (operation 930-N) to not perform the pre-processing operation.

The electronic device 400 may generate a first image (e.g., the first image 611 in FIG. 6) having quality identical with or more reduced (or deteriorated) than quality of an original image (e.g., the original image 510 in FIG. 6). The electronic device 400 may load the second transmission filter 622 stored in the memory 410, and may generate a first image stream (e.g., the first image stream 631 in FIG. 6) in a way to perform the pre-processing of the first image 611 by using the second transmission filter 622.

The electronic device 400 may generate a second image (e.g., the second image 612 in FIG. 6) having lower quality than the first image 611 by using the original image 510. The electronic device 400 may load the second transmission filter 622 stored in the memory 410, and may generate a second image stream (e.g., the second image stream 632 in FIG. 6) in a way to perform the pre-processing of the second image 612 by using the second transmission filter 622. The first image 611 and the second image 612 may be images which are different in quality, but include the same object. The second image stream 632 may be an image stream having lower quality than the first image stream 631.

Figure 10:
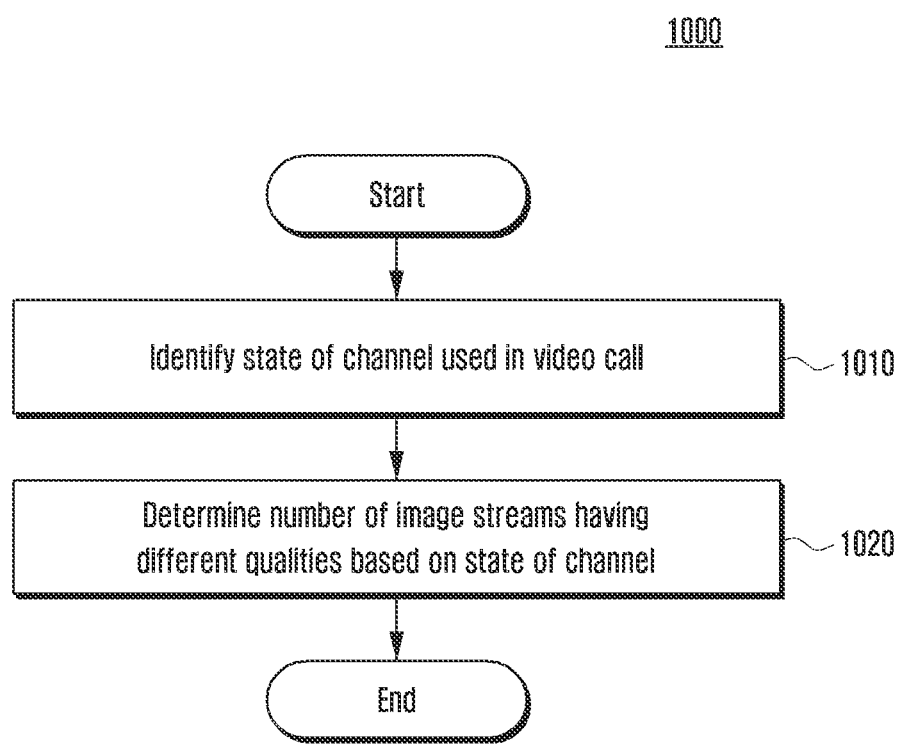
FIG. 10 is an operation flowchart illustrating an operating method of an electronic device according to an embodiment of the disclosure.

FIG. 10 is an operation flowchart 1000 illustrating an operating method of an electronic device according to an embodiment of the disclosure.

Operations (e.g., 1010 and 1020) illustrated in FIG. 10 may be performed on a processor (e.g., the processor 420 in FIG. 4) of an electronic device (e.g., the electronic device 400 in FIG. 4).

The electronic device 400 may change the number of image streams to be generated and transmitted based on a state of a channel used by the electronic device 400 or the type of communication (e.g., short-range wireless communication or cellular wireless communication) used by the electronic device 400.

Referring to FIG. 10, at operation 1010, an electronic device (e.g., the electronic device 400 in FIG. 4) may identify a state of a channel used in a video call.

The state of the channel may include quality of the channel. The quality of the channel may be determined by various measurement items. According to an embodiment, the electronic device 400 may measure the intensity of a signal transmitted by a base station supporting cellular communication in the state in which the electronic device 400 has been connected to the base station through cellular communication, and may identify quality (e.g., a received signal strength indicator (RSSI)) of a channel based on the measured intensity of the signal. According to another embodiment, the electronic device 400 may measure the intensity of a signal transmitted by an access point (AP) supporting short-range wireless communication in the state in which the electronic device 400 has been connected to the AP through short-range wireless communication, and may identify quality (e.g., an RSSI) of a channel based on the measured intensity of the signal.

At operation 1020, the electronic device 400 may determine the number of image streams having different qualities based on the state of the channel.

The quality of the image stream may include resolution of the image stream. The electronic device 400 may determine (or change) the number of image streams to be transmitted based on quality of a channel used by the electronic device 400. The processor 420 may determine the number of resolution levels of image streams to be transmitted with reference to data to which the number of resolution levels of the image streams according to quality of a channel used by the electronic device 400 has been mapped on the memory 410. For example, the mapped data may be implemented as in Table 1.

As quality of a channel is higher, the electronic device 400 may transmit a larger number of image streams because more bandwidths can be allocated to the electronic device 400. The electronic device 400 may increase the number of image streams to be transmitted as quality of a channel used by the electronic device 400 for a video call becomes better. The electronic device 400 may decrease the number of image streams to be transmitted as quality of a channel used by the electronic device 400 for a video call is decreased.

The electronic device 400 may determine (or change) the number of image streams to be generated and transmitted based on the type of communication (e.g., short-range wireless communication or cellular wireless communication) used by the electronic device 400. The short-range wireless communication may have a wider bandwidth than the cellular wireless communication. Accordingly, the electronic device 400 may generate and transmit more image streams than the number of image streams to be transmitted when the electronic device 400 uses the cellular communication in the state in which the electronic device 400 has been connected to the short-range wireless communication.

Through such a method, the electronic device 400 may change the number of image streams based on a state of a channel or the type of communication used. Accordingly, the server 350 may transmit an image stream having proper quality suitable for a situation of an external electronic device.

An electronic device according to various embodiments of the disclosure may include a memory storing a first codec and a second codec having lower performance than the first codec, communication circuitry, and a processor. The processor may be configured to receive, from a server related to a video call, performance information of external electronic devices participating in the video call, determine whether to perform encoding using the first codec based on the performance information, and control the communication circuitry to transmit, to the server, a first image stream encoded using the first codec and a second image stream encoded using the second codec based on the determination.

In an electronic device according to various embodiments of the disclosure, the processor may be configured to identify whether an electronic device not supporting the first codec among the external electronic devices is present based on the performance information and to generate both the first image stream encoded using the first codec and the second image stream encoded using the second codec based on the identification of the presence of the external electronic device not supporting the first codec.

In an electronic device according to various embodiments of the disclosure, the processor may be configured to not perform the encoding operation using the second codec based on the identification of the absence of an external electronic device not supporting the first codec.

In an electronic device according to various embodiments of the disclosure, the performance information of the external electronic device may include information indicating whether the external electronic device supports the decoding of the image stream through the first codec.

In an electronic device according to various embodiments of the disclosure, the first image stream encoded using the first codec may be an image stream having better quality than the second image stream encoded using the second codec.

In an electronic device according to various embodiments of the disclosure, the processor may be configured to control the communication circuitry to transmit, to the server, the second image stream together with a third image stream encoded by using the second codec. The second image stream may be an image stream having better quality than the third image stream.

In an electronic device according to various embodiments of the disclosure, the first codec may be a codec having a higher compression ratio than the second codec.

An operating method of an electronic device according to various embodiments of the disclosure may include an operation of receiving, from a server related to a video call, performance information of external electronic devices participating in the video call, an operation of determining whether to perform encoding using the first codec based on the performance information, and an operation of transmitting, to the server, a first image stream encoded using the first codec and a second image stream encoded using the second codec having lower performance than the first codec based on the determination.

An operating method of an electronic device according to various embodiments of the disclosure may further include an operation of identifying whether an electronic device not supporting the first codec among the external electronic devices is present based on the performance information and an operation of generating both the first image stream encoded using the first codec and the second image stream encoded using the second codec based on the identification of the presence of the external electronic device not supporting the first codec.

An operating method of an electronic device according to various embodiments of the disclosure may further include an operation of performing the encoding using the first codec without performing the encoding using the second codec based on the identification of the absence of an external electronic device not supporting the first codec.

In an operating method of an electronic device according to various embodiments of the disclosure, the performance information of the external electronic device may include information indicating whether the external electronic device supports the decoding of the image stream through the first codec.

In an operating method of an electronic device according to various embodiments of the disclosure, the first image stream encoded using the first codec may be an image stream having better quality than the second image stream encoded using the second codec.

An operating method of an electronic device according to various embodiments of the disclosure may further include an operation of transmitting, to the server, the second image stream together with a third image stream encoded by using the second codec. The second image stream may be an image stream having better quality than the third image stream.

In an operating method of an electronic device according to various embodiments of the disclosure, the first codec may be a codec having a higher compression ratio than the second codec.

An electronic device according to various embodiments of the disclosure may include communication circuitry and a processor. The processor may be configured to receive, from a server related to a video call, performance information of external electronic devices participating in the video call, determine whether to perform a pre-processing operation using a first transmission filter based on the performance information, and control the communication circuitry to transmit, to the server, an image stream pre-processed and an image stream not pre-processed using the first transmission filter based on the determination of the execution of the pre-processing operation.

In an electronic device according to various embodiments of the disclosure, the performance information of the external electronic device may include information indicating whether a post-processing operation using a reception filter corresponding to the first transmission filter is supported.

In an electronic device according to various embodiments of the disclosure, the processor may be configured to determine to perform the pre-processing operation using the first transmission filter based on absence of an external electronic device not supporting the post-processing operation using the reception filter corresponding to the first transmission filter.

An electronic device according to various embodiments of the disclosure may include communication circuitry and a processor. The processor may be configured to transmit, to a server related to a video call, images having different qualities based on state information of a channel used by the electronic device. The number of qualities may be changed based on the state information.

In an electronic device according to various embodiments of the disclosure, the state information may include maximum bandwidth information corresponding to the channel.

In an electronic device according to various embodiments of the disclosure, the processor may be configured to determine the number of qualities based on a type of wireless communication used by the electronic device.

The electronic device may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
 a memory storing a first codec and a second codec having lower performance than the first codec;
 communication circuitry; and
 a processor,
 wherein the processor is configured to:
  receive, from a server related to a video call, performance information of external electronic devices participating in the video call,
  determine whether to perform encoding using the first codec based on the performance information, and
  control the communication circuitry to transmit, to the server, a plurality of image streams including a first image stream encoded using the first codec and a second image stream encoded using the second codec based on the determination,
  wherein the number of the plurality of image streams is determined based on a quality of channel used by the electronic device.

2. The electronic device of claim 1, wherein the processor is further configured to:
 identify whether an external electronic device not supporting the first codec among the external electronic devices is present based on the performance information; and
 generate both the first image stream encoded using the first codec and the second image stream encoded using the second codec based on the identification of a presence of the external electronic device not supporting the first codec.

3. The electronic device of claim 2, wherein the processor is further configured to not perform the encoding using the second codec based on the identification of absence of an external electronic device not supporting the first codec.

4. The electronic device of claim 1, wherein the performance information of the external electronic devices comprises information indicating whether each external electronic device supports decoding of an image stream through the first codec.

5. The electronic device of claim 1, wherein the first image stream encoded using the first codec is an image stream having better quality than the second image stream encoded using the second codec.

6. The electronic device of claim 1,
 wherein the processor is further configured to control the communication circuitry to transmit, to the server, the second image stream together with a third image stream encoded by using the second codec, and
 wherein the second image stream is an image stream having better quality than the third image stream.

7. The electronic device of claim 1, wherein the first codec is a codec having a higher compression ratio than the second codec.

8. An operating method of an electronic device, the operating method comprising:
 receiving, from a server related to a video call, performance information of external electronic devices participating in the video call;
 determining whether to perform encoding using a first codec based on the performance information; and
 transmitting, to the server, a plurality of image streams including a first image stream encoded using the first codec and a second image stream encoded using a second codec having lower performance than the first codec based on the determination,
 wherein the number of the plurality of image streams is determined based on a quality of channel used by the electronic device.

9. The operating method of claim 8, further comprising:
 identifying whether an external electronic device not supporting the first codec among the external electronic devices is present based on the performance information; and
 generating both the first image stream encoded using the first codec and the second image stream encoded using the second codec based on the identification of a presence of the external electronic device not supporting the first codec.

10. The operating method of claim 9, further comprising performing the encoding using the first codec without performing the encoding using the second codec based on the identification of absence of an external electronic device not supporting the first codec.

11. The operating method of claim 8, wherein the performance information of the external electronic devices comprises information indicating whether each external electronic device supports decoding of an image stream through the first codec.

12. The operating method of claim 8, wherein the first image stream encoded using the first codec is an image stream having better quality than the second image stream encoded using the second codec.

13. The operating method of claim 8, further comprising:
 transmitting, to the server, the second image stream together with a third image stream encoded by using the second codec,
 wherein the second image stream is an image stream having better quality than the third image stream.

14. The operating method of claim 8, wherein the first codec is a codec having a higher compression ratio than the second codec.

* * * * *